Oct. 29, 1940.   T. P. CHASE   2,219,765
HYDRAULIC BRAKE
Filed May 6, 1939   2 Sheets-Sheet 1

Inventor
Theron P. Chase
By
Blackmore, Spencer & Flint
Attorneys

Oct. 29, 1940.　　　T. P. CHASE　　　2,219,765
HYDRAULIC BRAKE
Filed May 6, 1939　　　2 Sheets-Sheet 2

Inventor
Theron P. Chase
By Blackmore, Spencer & Oliver
Attorneys

Patented Oct. 29, 1940

2,219,765

UNITED STATES PATENT OFFICE 2,219,765

HYDRAULIC BRAKE

Theron P. Chase, Detroit, Mich., assignor to General Motors Corporation, Detroit, Mich., a corporation of Delaware Application May 6, 1939, Serial No. 272,185

3 Claims. (Cl. 188—152)

This invention relates to brakes and more particularly to hydraulic brakes for vehicles.

An object of the invention is to provide a hydraulic system for applying a plurality of brakes from a single pressure source and having means whereby the pressure upon a part of said brakes may be rendered unlike that upon another part.

Other objects will be understood from the description which follows.

Figure 1:
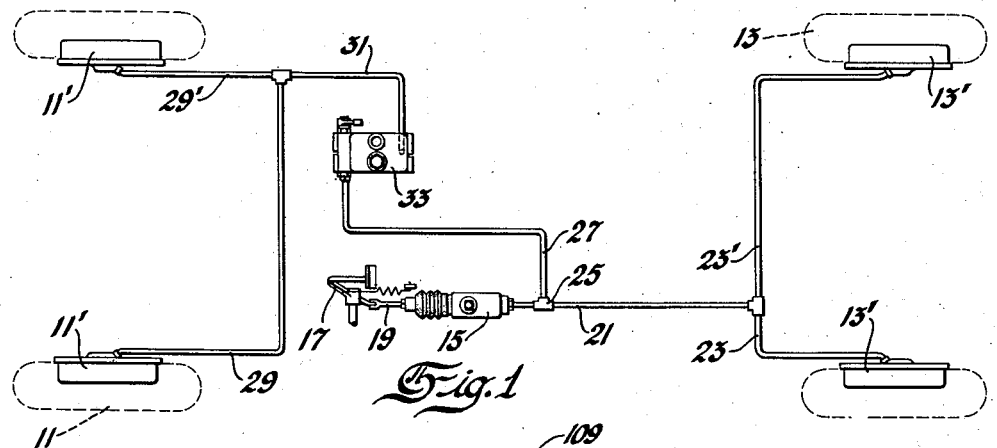
Figure 1 is a diagrammatic plan of my brake system applied to the front and rear wheel brakes of a vehicle.
Figure 2:
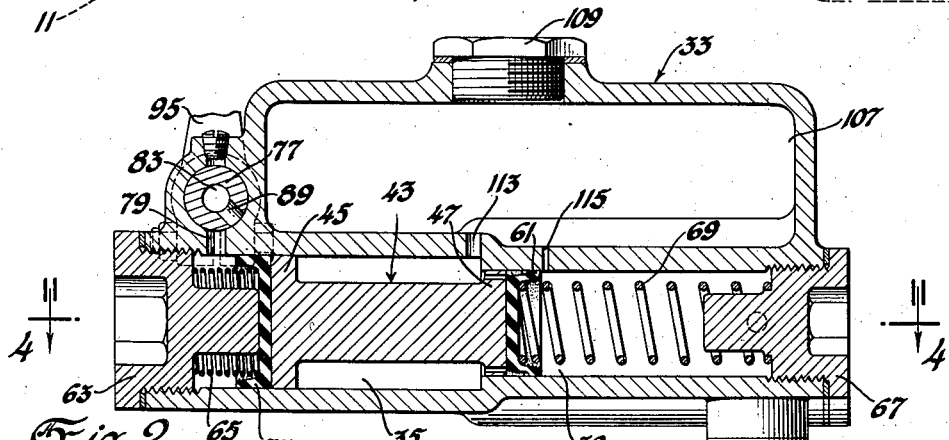
Figure 2 is a vertical section through one member of the system, the section being indicated by line 2—2 of Figure 4.
Figure 3:
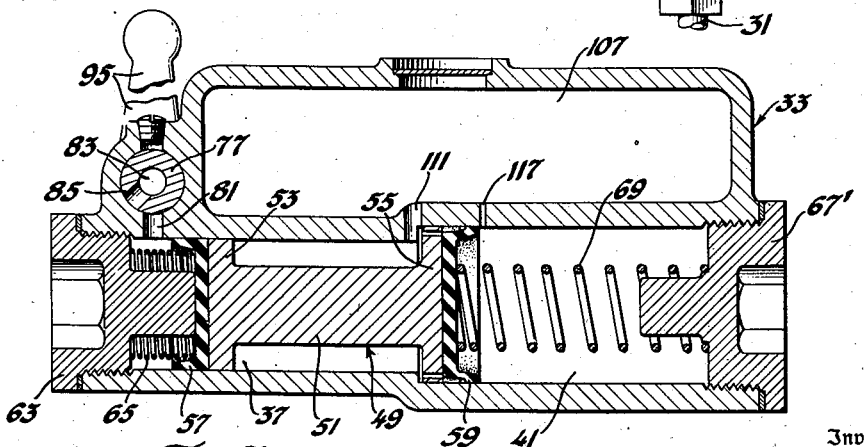
Figure 3 is a section on line 3—3 of Figure 4.
Figure 4:
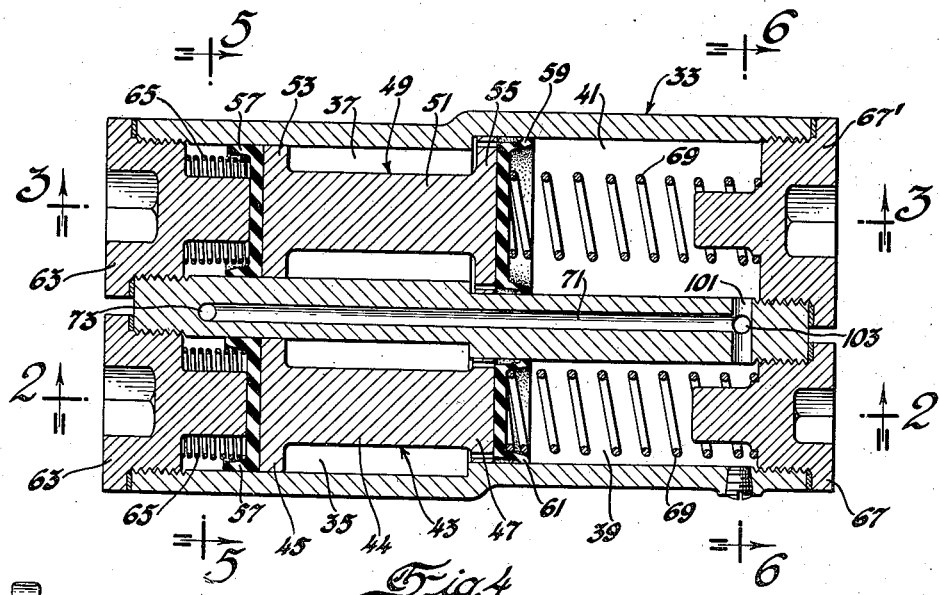
Figure 4 is a longitudinal section on line 4—4 of Figure 2.
Figures 5, 6:
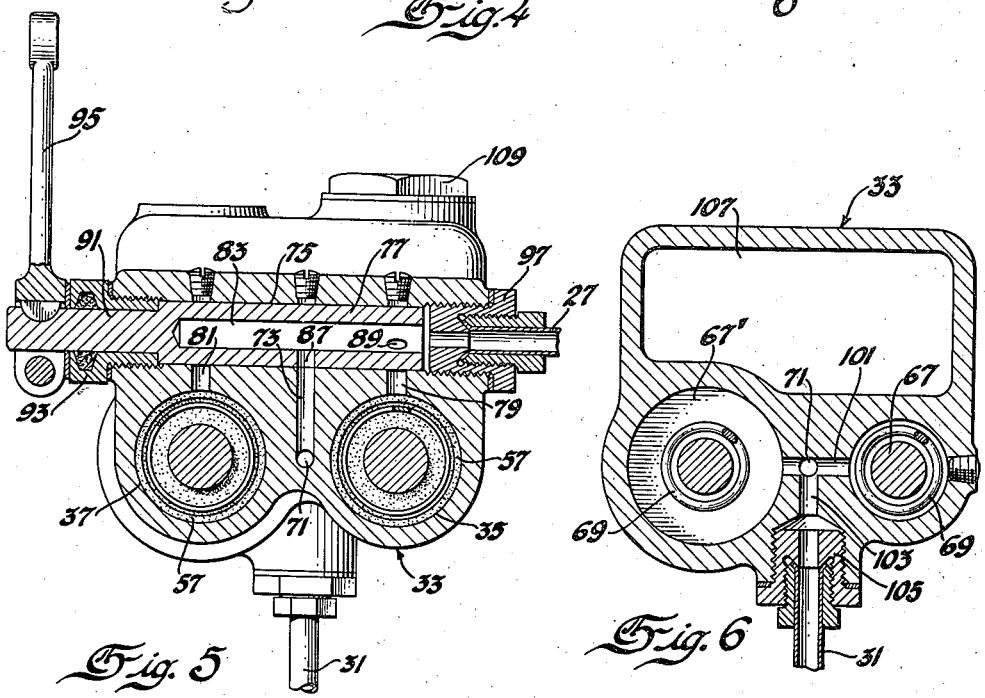

Figures 5 and 6 are sections on line 5—5 and 6—6 respectively of Figure 4.

Referring to the drawings, numerals 11 and 13 are used to designate the front wheels and rear wheels respectively of a vehicle. The brake drums for the wheels 11 and 13 are marked 11' and 13'.

The master cylinder for applying the brakes is represented by numeral 15. No novelty is herein claimed for this master cylinder, nor for the wheel cylinders and shoe assemblies within the drums. A pedal 17 is shown operably connected to a rod 19 for moving the piston, not shown, of the master cylinder. The master cylinder is connected to the cylinders of the rear wheel brakes by a pipe line including a conduit 21 and branch conduits 23, 23'. Branching from the conduit 21 at 25 is a conduit 27 to convey hydraulic medium from the master cylinder for applying front wheel brakes. Branch conduits 29 and 29' at the front wheel brakes unite with a conduit 31 which is operably connected to conduit 27 by means of a casing 33 containing mechanism which may be manipulated to control the pressure in the front wheel brakes and therefore the ratio between the pressure on the rear brakes and the front brakes.

Casing 33 is formed to include two cylinders 35 and 37 which may be of equal diameter. These cylinders are located side by side as shown in Figure 4. Cylinder 35 at its rear end merges with a cylinder 39 having a diameter which is less than that of cylinder 35. Cylinder 37 merges with a cylinder 41 having a diameter which is larger than the diameter of cylinder 37. Within cylinders 35 and 39 there moves a double piston 43 having an intermediate part 44 between enlarged heads 45 and 47 fitting the cylinders 35 and 39. Within cylinders 37 and 41 is a double piston 49 having an intermediate part 51 and enlarged heads 53 and 55 which fit their respective cylinders. The pistons have packings 57, 59 and 61 as indicated. Threaded into the casing adjacent one end of each cylinder is a plug 63. A spring 65 is positioned between these plugs and the adjacent piston heads. Plugs 67, 67' are similarly threaded into casing at the other end of these cylinders and springs 69 are placed between the plugs and the piston heads 47 and 55. An intermediate passage between and parallel with the cylinders is shown at 71 in Figure 4. At one end, this passage joins a vertical inlet passage 73 communicating with a transverse passage 75 within which rotates a hollow valve 77. Cylinders 35 and 37 to the left of piston heads 45 and 53 communicate with passage 75 by means of passages 79 and 81. The valve 77 is formed with a central longitudinal passage 83 from which extend circumferentially displaced radial passages 85, 87 and 89 so that passage 83 may be brought into communication with passages 81, 73 and 79 by rotating the valve. The valve stem 91 extends through a threaded plug 93 and carries a manually operable lever 95. Into the other end of passage 75 is threaded a hollow plug 97 which is adapted to be connected to the conduit 27. At the end of cylinders 39 and 41, adjacent plugs 67 and 67', is a connecting passage 101, seen in Figure 6 and communicating with both cylinders. This passage 101 communicates with the end of passage 71 and, by means of a casing passage 103 and a hollow plug 105, is in communication with pipe 31. Formed in the casing above the cylinders is a reservoir 107 which is provided with a removable filler plug 109. This reservoir is at all times in communication with the space between the two heads of each of the two pistons by means of passages 111 and 113. It also is open to the cylinders 39 and 41 when the pistons are in their retracted positions. This communication is afforded by passages 115 and 117.

The drawings show the parts in the position they occupy when the brakes are released. The reservoir 107 is in communication with cylinders 35 and 37 between the piston heads and also with cylinders 39 and 41 for the reason that springs 69 have pushed back both pistons and thereby opened passage 115, 117. The drawings show the valve 77 rotated to a position such that its longitudinal passage 83 communicates by way of passages 87 and 73 with the casing passage 71. The latter is open to conduit 31. When the pedal is depressed the brakes at the rear wheels are applied in the usual way as are also the front brakes because of the continuous conduit through casing 33 as just explained. If it be desired to apply a pressure on the front brakes which shall be less than that of the rear brakes, the valve 77 is rotated to bring its radial passage 85 into registration with passage 81. When now the brakes are applied the fluid medium is cut off from passage 73 nor is it operable upon the piston of cylinder 35. It does, however, move piston 49 and owing to the fact that cylinder 41 is of greater diameter than cylinder 37 the pressure therein is less than that in the chamber to the left of head 53. The pressure applied to the front brakes is therefore less than that applied to the rear brakes. In a similar manner the valve may be adjusted to render inoperative cylinder 37 but to render cylinder 35 operative. In this latter case the front wheel brakes are applied more effectively than the rear wheel brakes inasmuch as, owing to the unequal dimensions of cylinders 35 and 39, there is an increase of pressure developed for applying the front brakes. It may be noted that when the central passage 71 is cut off and one or the other of the pistons 43 or 49 is being used, the fluid column for applying the front brakes is independent of the fluid column associated with the master cylinder. It is for this reason that the reservoir 107 is provided in the casing 33. By means of the removable plug 109 the cylinders 39 and 41 may be supplied with fluid.

I claim:

1. A hydraulic brake system having a first set of brakes, a second set of brakes, a pressure source, a first conduit between said source and said first set, a second conduit to transmit fluid from said source and operable upon said second set, said second conduit having first and second portions, an adjustable means connecting said portions whereby the pressure in said second portion may be equal or unequal to the pressure in said first portion, said adjustable means including an auxiliary brake applying means and a valve movable to a position whereby said portions may be directly connected or to a position to divert the flow to said auxiliary means to change the ratio of pressures in said portions and reservoir means associated with said auxiliary brake applying means.

2. A hydraulic brake system having a first set of brakes, a second set of brakes, a pressure source, a first conduit between said source and said first set, a second conduit to transmit fluid from said source and operable upon said second set, said second conduit having first and second portions, an adjustable means connecting said portions whereby the pressure in said second portion may be equal or unequal to the pressure in said first portion, said adjustable means including a plurality of pressure changing means and a valve whereby the portions may be directly connected or may be moved to connect the first portion with either of said pressure changing means.

3. A hydraulic brake system having a first set of brakes, a second set of brakes, a pressure source, a first conduit between said source and said first set, a second conduit to transmit fluid from said source and operable upon said second set, said second conduit having first and second portions, an adjustable means connecting said portions whereby the pressure in said second portion may be equal or unequal to the pressure in said first portion, said adjustable means including a plurality of pressure changing means and a valve whereby the portions may be directly connected or may be moved to connect the first portion with either of said pressure changing means, each of said pressure changing means including a piston having first and second unequally dimensioned heads, said valve operable to admit fluid from the first portion to one of said heads, the other of said heads being operable to transmit fluid to said second portion.

THERON P. CHASE.